United States Patent
Kumar et al.

(10) Patent No.: US 10,616,354 B2
(45) Date of Patent: Apr. 7, 2020

(54) EVENT TRACKING FOR MESSAGING PLATFORM

(71) Applicant: Facebook, Inc., Menlo Park, CA (US)

(72) Inventors: Ishaan Kumar, San Francisco, CA (US); John Stephen Anderson, Portola Valley, CA (US); Thilak Thenpandyian, Union City, CA (US); Mandeep Dhillon, San Jose, CA (US); Abhishek Nandakumar, Belmont, CA (US); Yeon Seung Hong, Singapore (SG); Alessia Antonucci, San Francisco, CA (US); Himanshu Baweja, Sunnyvale, CA (US); Natapa Phruthisaranphong, Singapore (SG)

(73) Assignee: FACEBOOK, INC., Menlo Park, CA (US)

( * ) Notice: Subject to any disclaimer, the term of this patent is extended or adjusted under 35 U.S.C. 154(b) by 165 days.

(21) Appl. No.: 15/650,567

(22) Filed: Jul. 14, 2017

(65) Prior Publication Data

US 2019/0020725 A1 Jan. 17, 2019

(51) Int. Cl.
*H04L 29/08* (2006.01)
*G06F 9/54* (2006.01)
(Continued)

(52) U.S. Cl.
CPC ............. *H04L 67/22* (2013.01); *G06F 9/542* (2013.01); *G06F 11/3065* (2013.01);
(Continued)

(58) Field of Classification Search
CPC ......... H04L 67/22; H04L 43/06; H04L 41/22; H04L 41/069; H04L 43/08; G06Q 10/109;
(Continued)

(56) References Cited

U.S. PATENT DOCUMENTS

| 2009/0089806 A1* | 4/2009 | Mayer | G06F 9/542 |
| | | | 719/318 |
| 2011/0307562 A1* | 12/2011 | Chakra | G06Q 10/10 |
| | | | 709/206 |

(Continued)

OTHER PUBLICATIONS

International Search Report and Written Opinion—PCT/US2017/042445—ISA/EPO—dated Apr. 13, 2018.

*Primary Examiner* — Michael Won
(74) *Attorney, Agent, or Firm* — Kilpatrick Townsend & Stockton LLP

(57) ABSTRACT

The present disclosure relates to tracking events that result from a conversation on a messaging platform and that occur outside of the messaging platform. In one embodiment, the messaging platform may provide a user-selectable option that enables a first party or a second party to indicate that an event has occurred outside of the messaging platform. In another embodiment, the messaging platform may be configured to detect when a document is exchanged in a conversation via the messaging platform. In yet another embodiment, information may be extracted from a document exchanged in a conversation via a messaging platform. The extracted information may be used to determine whether an event has occurred outside of the messaging platform.

30 Claims, 15 Drawing Sheets

100

ENABLING A CONVERSATION BETWEEN A FIRST PARTY AND A SECOND PARTY VIA A MESSAGING PLATFORM
110

DETERMINE AN OCCURRENCE OF AN EVENT BETWEEN THE FIRST PARTY AND THE SECOND PARTY, THE EVENT OCCURRING OUTSIDE THE MESSAGING PLATFORM AND RESULTING FROM THE CONVERSATION
120

PERFORM ONE OR MORE ACTIONS BASED ON INFORMATION RELATED TO THE EVENT
130

(51) Int. Cl.
  *G06F 11/30* (2006.01)
  *G06Q 10/10* (2012.01)
  *H04L 12/26* (2006.01)
  *H04L 12/24* (2006.01)

(52) U.S. Cl.
  CPC ....... *G06F 11/3075* (2013.01); *G06Q 10/109* (2013.01); *H04L 41/069* (2013.01); *H04L 41/22* (2013.01); *H04L 43/06* (2013.01); *H04L 43/08* (2013.01)

(58) Field of Classification Search
  CPC ... G06F 11/3075; G06F 9/542; G06F 11/3065
  See application file for complete search history.

(56) References Cited

U.S. PATENT DOCUMENTS

| | | | |
|---|---|---|---|
| 2014/0058939 A1 | 2/2014 | Savla | |
| 2014/0330956 A1* | 11/2014 | Telfer | H04L 43/04 709/224 |
| 2015/0142643 A1 | 5/2015 | Ceribelli et al. | |
| 2015/0295872 A1* | 10/2015 | Hawryluk | G06F 21/6245 715/752 |
| 2016/0104159 A1 | 4/2016 | Butterfield et al. | |
| 2016/0180325 A1 | 6/2016 | Davis et al. | |
| 2016/0255139 A1* | 9/2016 | Rathod | G06F 16/9535 709/203 |
| 2017/0178124 A1 | 6/2017 | Havilio | |
| 2018/0158347 A1* | 6/2018 | Sarafzade | G06Q 10/109 |
| 2018/0268337 A1* | 9/2018 | Miller | G06Q 10/109 |
| 2018/0285827 A1* | 10/2018 | Dotan-Cohen | G06Q 10/1095 |
| 2019/0020725 A1* | 1/2019 | Kumar | H04L 67/22 |

\* cited by examiner

500

DETECT COMMUNICATION OF A MESSAGE BETWEEN A FIRST PARTY AND A SECOND PARTY IN A CONVERSATION VIA A MESSAGING PLATFORM, THE MESSAGE INCLUDING A DOCUMENT
510

DETERMINE, BASED ON THE DOCUMENT, THAT THE MESSAGE IS INDICATIVE OF AN OCCURRENCE OF AN EVENT OUTSIDE THE MESSAGING PLATFORM
520

PROVIDE, VIA A MESSAGING PLATFORM, A GRAPHICAL USER INTERFACE ENABLING A PARTY TO ENTER INFORMATION RELATED TO THE EVENT
530

RECEIVE, VIA THE GRAPHICAL USER INTERFACE, THE INFORMATION RELATED TO THE EVENT
540

DETECT COMMUNICATION OF A MESSAGE BETWEEN A FIRST PARTY AND A SECOND PARTY THAT INCLUDES A DOCUMENT
910

EXTRACT INFORMATION FROM THE DOCUMENT
920

DETERMINE AN OCCURRENCE OF AN EVENT BASED ON THE EXTRACTED INFORMATION
930

IS MORE INFORMATION NEEDED?
940

N → CAUSE A FIRST USER INTERFACE TO BE DISPLAYED, THE FIRST USER INTERFACE ENABLING A PARTY TO CONFIRM THE ACCURACY OF THE EXTRACTED INFORMATION
950

Y → CAUSE A SECOND USER INTERFACE TO BE DISPLAYED, THE SECOND USER INTERFACE ENABLING A PARTY TO ENTER ADDITIONAL INFORMATION RELATED TO THE EVENT
960

RECEIVE, VIA THE SECOND USER INTERFACE, THE ADDITIONAL INFORMATION RELATED TO THE EVENT
970

CAUSE THE FIRST USER INTERFACE TO BE DISPLAYED, THE FIRST USER INTERFACE ENABLING A PARTY TO CONFIRM THE ACCURACY OF THE EXTRACTED INFORMATION AND THE ADDITIONAL INFORMATION
980

FIG. 9

EVENT TRACKING FOR MESSAGING PLATFORM

BACKGROUND

A social networking system (SNS) may enable its users to interact with and share information with each other through various interfaces provided by the SNS. For example, the SNS may provide a messaging platform for users to send messages to each other. Conversations between users using the messaging platform may result in events that occur outside the messaging platform or the social networking system. Conventionally, there is no way to track such events or even associate them with conversations or with the user involved in the conversations.

SUMMARY

The present disclosure relates generally to event tracking on a messaging platform, and more particularly to tracking events that result from a conversation on a messaging platform and that occur outside of the messaging platform.

Various inventive embodiments are described herein, including methods, systems, non-transitory computer-readable storage media storing programs, code, or instructions executable by one or more processors, and the like, for event tracking. A first party and a second party may exchange messages via a messaging platform. The conversation between the parties via the messaging platform may result in the occurrence of an event, where the event occurs outside of the messaging platform. As a result, the messaging platform is unaware of the occurrences of such events. In certain embodiments, techniques are provided that enable the messaging platform to receive information regarding the occurrences of such events. This enables the messaging platform to associate events with conversations and the parties involved in the conversations.

In one embodiment, the messaging platform may provide a user-selectable option (e.g., a button) that enables a first party or a second party to indicate that an event involving the parties has occurred outside of the messaging platform. Upon selection of the user-selectable option, a user interface may be presented for the party selecting the option to input information related to the event. In some examples, information may be input as part of the same messaging platform conversation between the first and second parties.

In another embodiment, the messaging platform may be configured to detect when a document is exchanged in a conversation via the messaging platform. Upon detection of the document, the messaging platform may provide a user interface to a party of the conversation that enables the party to input information related to an event indicated by the document. While the user interface may be presented any time that a document is exchanged, in some embodiments, the user interface may be presented when it is determined that the document indicates an occurrence of the event.

In yet another embodiment, information may be extracted from a document exchanged between a first party and a second party in a conversation facilitated by a messaging platform. The extracted information may be used to determine whether an event has occurred between the parties outside of the messaging platform. The extracted information may be also used to determine values for attributes related to the event, such as the date when the event occurred, the amount of value exchanged as part of the event, and the like. In some embodiments, a user interface may be provided for one or both of the parties to input information related to the event, such as information that could not be determined from the information extracted from the document.

Accordingly, in various embodiments, a messaging platform (or a system communicating with or providing the messaging platform, such as a social networking system (SNS)) may receive and store information related to events that result from conversations facilitated by the messaging platform but where the events occur outside the messaging platform (or the social networking system). The event-related information may then be used for various purposes. For example, the event-related information may be used to generate a report for a party (e.g., the first party or the second party) identifying events that occurred involving the party resulting from conversations the party participated in using the messaging platform. For example, a report may be generated that identifies a set of one or more metrics associated with multiple events that involved the party. For example, a metric may include an amount of total value generated for the party from events that began as conversations using the messaging platform (including a breakdown of events occurring inside and outside of the messaging platform). As another example, a conversion rate report may be generated for a party identifying what percentage of conversations that the party participated in using the messaging platform the resulted in events. Various other information and metrics related to the events may also be provided via these reports.

According to certain embodiments, techniques may be provided for tracking events that occur outside of a messaging platform. The messaging platform may enable a conversation between a first party and a second party. While not intended to be limiting, the conversation may include one or more messages exchanged between the first party and the second party via the messaging platform. An occurrence of an event between the first party and the second party may be determined, the event occurring outside the messaging platform and resulting from the conversation. Information related to the event may be stored. In some embodiments, the information may be stored such that it is associated with the first party or the second party. This information may then be used to generate a report for the first party or for the second party, where the report comprises information related to the event.

In certain embodiments, the messaging platform may provide a graphical user interface with a user-selectable option (e.g., a button) for indicating the occurrence of the event. A party involved in a conversation via the messaging platform may select the user-selectable option to indicate that the event has occurred. In certain embodiments, upon selection of the user-selectable option, the messaging platform may display a graphical user interface that enables a party to enter information related to the event, such as when the event occurred, the services or goods involved in the event, the value exchanged (e.g., a sale amount) for the event, a location where the event occurred, and other information related to the event.

As another example, communication of a message between the parties related to the event and exchanged between the parties via the conversation via the messaging platform may be detected. For exchange, a message sent by one party to another party in the conversation may include a document (e.g., a receipt) that indicates the occurrence of the event. In certain embodiments, one or more machine learning models may be used to detect such a message and to determine that the document indicates the occurrence of an event. In some other embodiments, messages exchanges between the parties containing documents and the documents themselves may be analyzed based on a set of one or more criteria to determine the occurrence of the event. In one illustrative example, the set of one or more criteria may determine whether the document is of a particular document type.

In certain embodiments, information may be extracted from a document included in a message exchanged in a conversation between the parties. Based on the extracted information, the messaging platform may determine the occurrence of the event. When particular information related to the event cannot be determined from the information extracted from the document, a graphical user interface may be provided via the messaging platform for the first party or the second party to enter the particular information As previously described, information related to an event may be stored such that the information is associated with the first party or the second party. A report may be generated for the first party based upon the stored information, where the report includes the information related to the event and potentially related to other events involving the first party that resulted from conversations via the messaging platform that the first party participated in. For example, if the first party is a seller of goods, a report generated for the first party may identify sales that occurred from conversations (e.g., sales pitches) made by the seller using the messaging platform. The report may include information identifying a conversion rate for the seller, such as what percentage of the conversations that the seller was involved in using the messaging platform results in actual sales for the seller, where the sales occurred outside the messaging platform (or the social networking system providing the messaging platform).

A report may also be generated for the second party. For example, if the second party is a buyer of goods, a report generated for identifying the buying events that the buyer was involved in where the goods were bought as a result of conversations via the messaging platform involving the buyer.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5 is a simplified flowchart depicting processing performed for determining an occurrence of an event based on a document in a message according to certain embodiments.

FIG. 9 is a simplified flowchart depicting processing performed for determining an occurrence of an event based on extracted information from a document in a message according to certain embodiments.

DETAILED DESCRIPTION

Figure 1:
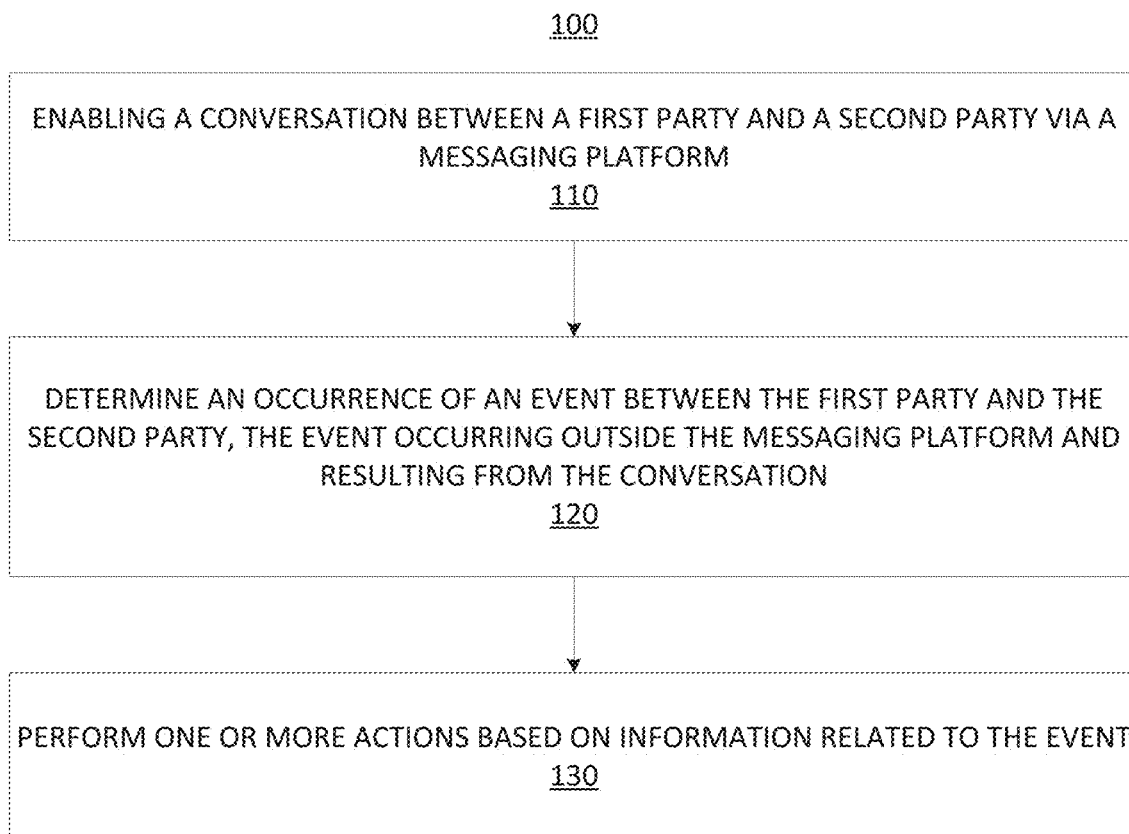
FIG. 1 is a simplified flowchart depicting processing performed for tracking events according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to event tracking on a messaging platform, and more particularly to tracking events that result from a conversation on a messaging platform and that occur outside of the messaging platform.

Various inventive embodiments are described herein, including methods, systems, non-transitory computer-readable storage media storing programs, code, or instructions executable by one or more processors, and the like, for event tracking. A first party and a second party may exchange messages via a messaging platform. The conversation between the parties via the messaging platform may result in the occurrence of an event, where the event occurs outside of the messaging platform. As a result, the messaging platform is unaware of the occurrences of such events. In certain embodiments, techniques are provided that enable the messaging platform to receive information regarding the occurrences of such events. This enables the messaging platform to associate events with conversations and the parties involved in the conversations.

In one embodiment, the messaging platform may provide a user-selectable option (e.g., a button) that enables a first party or a second party to indicate that an event involving the parties has occurred outside of the messaging platform. Upon selection of the user-selectable option, a user interface may be presented for the party selecting the option to input information related to the event. In some examples, information may be input as part of the same messaging platform conversation between the first and second parties.

In another embodiment, the messaging platform may be configured to detect when a document is exchanged in a conversation via the messaging platform. Upon detection of the document, the messaging platform may provide a user interface to a party of the conversation that enables the party to input information related to an event indicated by the document. While the user interface may be presented any time that a document is exchanged, in some embodiments, the user interface may be presented when it is determined that the document indicates an occurrence of the event.

In yet another embodiment, information may be extracted from a document exchanged between a first party and a second party in a conversation facilitated by a messaging platform. The extracted information may be used to determine whether an event has occurred between the parties outside of the messaging platform. The extracted information may be also used to determine values for attributes related to the event, such as the date when the event occurred, the amount of value exchanged as part of the event, and the like. In some embodiments, a user interface may be provided for one or both of the parties to input information related to the event, such as information that could not be determined from the information extracted from the document.

Accordingly, in various embodiments, a messaging platform (or a system communicating with or providing the messaging platform, such as a social networking system (SNS)) may receive and store information related to events that result from conversations facilitated by the messaging platform but where the events occur outside the messaging platform (or the social networking system). The event-related information may then be used for various purposes. For example, the event-related information may be used to generate a report for a party (e.g., the first party or the second party) identifying events that occurred involving the party resulting from conversations the party participated in using the messaging platform. For example, a report may be generated that identifies a set of one or more metrics associated with multiple events that involved the party. For example, a metric may include an amount of total value generated for the party from events that began as conversations using the messaging platform (including a breakdown of events occurring inside and outside of the messaging platform). As another example, a conversion rate report may be generated for a party identifying what percentage of conversations that the party participated in using the messaging platform the resulted in events. Various other information and metrics related to the events may also be provided via these reports.

According to certain embodiments, techniques may be provided for tracking events that occur outside of a messaging platform. The messaging platform may enable a conversation between a first party and a second party. While not intended to be limiting, the conversation may include one or more messages exchanged between the first party and the second party via the messaging platform. An occurrence of an event between the first party and the second party may be determined, the event occurring outside the messaging platform and resulting from the conversation. Information related to the event may be stored. In some embodiments, the information may be stored such that it is associated with the first party or the second party. This information may then be used to generate a report for the first party or for the second party, where the report comprises information related to the event.

In certain embodiments, the messaging platform may provide a graphical user interface with a user-selectable option (e.g., a button) for indicating the occurrence of the event. A party involved in a conversation via the messaging platform may select the user-selectable option to indicate that the event has occurred. In certain embodiments, upon selection of the user-selectable option, the messaging platform may display a graphical user interface that enables a party to enter information related to the event, such as when the event occurred, the services or goods involved in the event, the value exchanged (e.g., a sale amount) for the event, a location where the event occurred, and other information related to the event.

As another example, communication of a message between the parties related to the event and exchanged between the parties via the conversation via the messaging platform may be detected. For exchange, a message sent by one party to another party in the conversation may include a document (e.g., a receipt) that indicates the occurrence of the event. In certain embodiments, one or more machine learning models may be used to detect such a message and to determine that the document indicates the occurrence of an event. In some other embodiments, messages exchanges between the parties containing documents and the documents themselves may be analyzed based on a set of one or more criteria to determine the occurrence of the event. In one illustrative example, the set of one or more criteria may determine whether the document is of a particular document type.

In certain embodiments, information may be extracted from a document included in a message exchanged in a conversation between the parties. Based on the extracted information, the messaging platform may determine the occurrence of the event. When particular information related to the event cannot be determined from the information extracted from the document, a graphical user interface may be provided via the messaging platform for the first party or the second party to enter the particular information As previously described, information related to an event may be stored such that the information is associated with the first party or the second party. A report may be generated for the first party based upon the stored information, where the report includes the information related to the event and potentially related to other events involving the first party that resulted from conversations via the messaging platform that the first party participated in. For example, if the first party is a seller of goods, a report generated for the first party may identify sales that occurred from conversations (e.g., sales pitches) made by the seller using the messaging platform. The report may include information identifying a conversion rate for the seller, such as what percentage of the conversations that the seller was involved in using the messaging platform results in actual sales for the seller, where the sales occurred outside the messaging platform (or the social networking system providing the messaging platform).

A report may also be generated for the second party. For example, if the second party is a buyer of goods, a report generated for identifying the buying events that the buyer was involved in where the goods were bought as a result of conversations via the messaging platform involving the buyer.

FIG. 1 is a simplified flowchart depicting processing performed for tracking events according to certain embodiments. The processing depicted in FIG. 1 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 1 and described below is intended to be illustrative and non-limiting. Although FIG. 1 depicts the various processing steps occurring in a particular sequence or order, this is not intended to be limiting. In certain embodiments, the steps may be performed in some different order or some steps may also be performed in parallel.

In the embodiment depicted in FIG. 1, the processing may be triggered at 110 when a conversation between a first party and a second party is enabled via a messaging platform. Enabling the conversation may include sending messages between the first party and the second party and/or providing graphical user interfaces for displaying the messages on devices associated with the first party and the second party. The conversation may include one or more messages exchanged between the first party and the second party via the messaging platform, as depicted in and described below for FIGS. 3, 4A, 7, and 11A. While description herein may reference a first party and a second party, it should be recognized that a conversation may include more than two parties.

The messaging platform may be provided by a social networking system (SNS), as described below with reference to FIG. 14. However, it should be recognized that the messaging platform may be separate from the SNS. In addition, when this disclosure describes steps or operations performed by either the messaging platform the SNS, it should be recognized that the steps or operations may be performed by the messaging platform, the SNS, a different server, a device associated with the first party, a device associated with the second party, or any combination thereof. When the messaging platform is provided by the SNS, the first party and/or the second party may each be an entity (e.g., a user, an organization, or the like) that is registered with the SNS.

At 120, an occurrence of an event between the first party and the second party may be determined. The event (sometimes referred to as a conversion event) may occur outside the messaging platform and result from the conversation. For example, a party may cause the event to occur in response to a message of the conversation. Prior to embodiments described herein, the messaging platform would not have any way to track an event that occurred outside of the messaging platform.

For one illustrative example, the first party may send a message to the second party, the message requesting that the second party exchange value for a product and/or service provided by the second party. The value may be sent to the second party via a channel separate from the messaging platform. For example, the second party may contact a bank to send funds from the bank to the first party. The second party may then send a message to the first party, indicating completion of the transfer. Based on the message, it may be determined that a conversion event occurred. While there are many ways for the occurrence of the event to be determined, a few examples will be described below with respect to FIGS. 2, 5, and 9.

Figure 2:
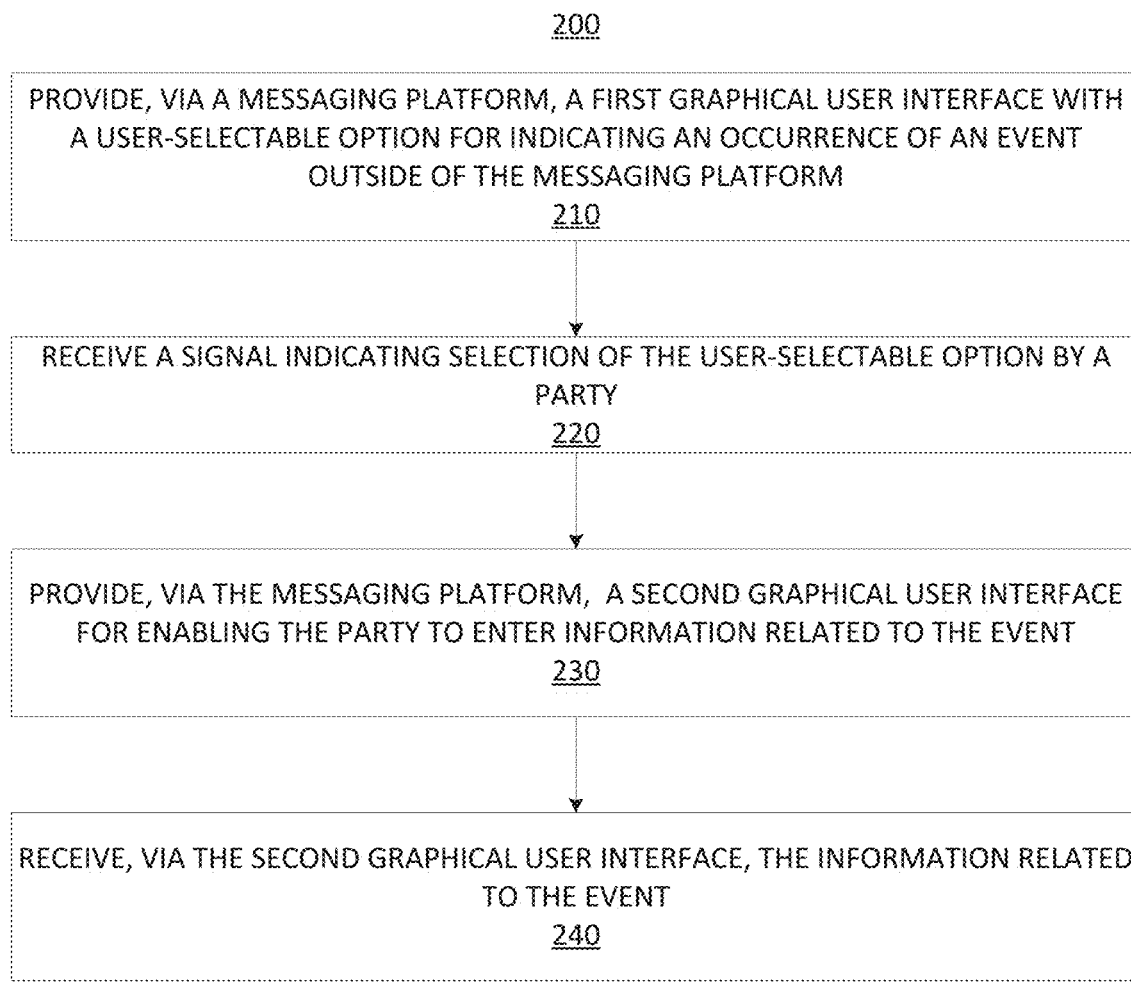
FIG. 2 is a simplified flowchart depicting processing performed for determining an occurrence of an event based on user feedback according to certain embodiments.

FIG. 2 is a simplified flowchart depicting processing performed for determining an occurrence of an event based on user feedback according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain embodiments, the steps may be performed in some different order or some steps may also be performed in parallel.

In the embodiment depicted in FIG. 2, the processing may be triggered at 210 when a first graphical user interface with a user-selectable option is provided via a messaging platform, the user-selectable option for indicating an occurrence of an event outside of the messaging platform. The messaging platform may be enabling a conversation between a first party and a second party, where the conversation includes one or more messages exchanged between the first party and the second party via the messaging platform as described above for FIG. 1. In some embodiments, at least some of the one or more messages may be presented along with the user-selectable option such that a party may view at least a portion of a message while selecting the user-selectable option.

Figure 3:
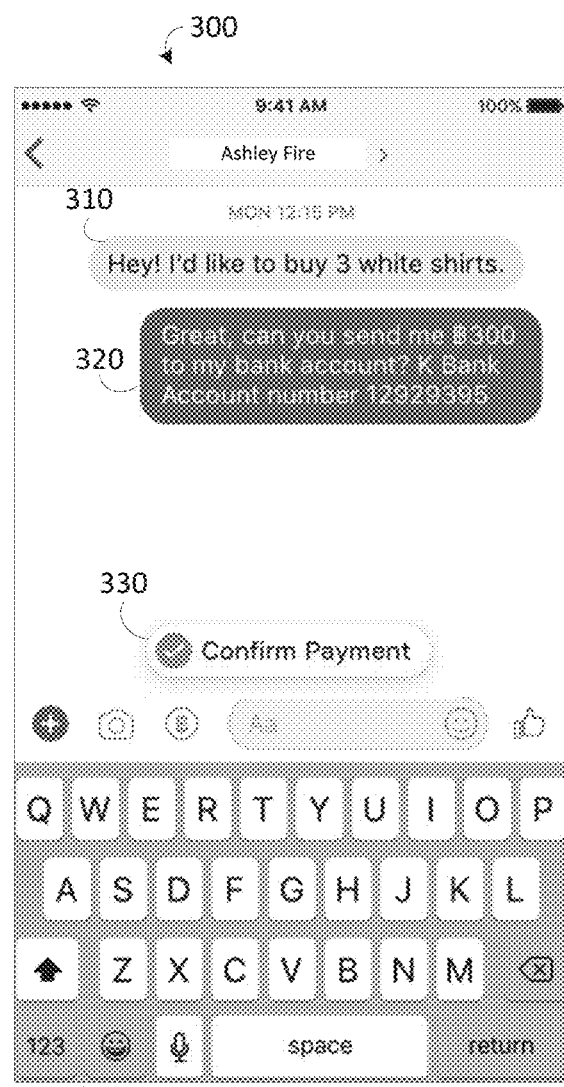
FIG. 3 depicts an example of a graphical user interface that includes a user-selectable option for indicating an occurrence of an event outside of a messaging platform.

FIG. 3 depicts an example of graphical user interface (GUI) 300 that includes user-selectable option 330 for indicating an occurrence of an event outside of the messaging platform according to certain embodiments. As described above, GUI 300 may be associated with a conversation between a first party and a second party. The conversation may be provided via the messaging platform. User-selectable option 330 may be visible at all times during the conversation. In some embodiments, user-selectable option 330 may only be visible to one of the parties (i.e., the first party or the second party). In other embodiments, user-selectable option 330 may be visible to both parties (i.e., the first party and the second party).

In one illustrative example, the conversation can begin with a message from the second party (e.g., first message 310) that states "Hey! I'd like to buy 3 white shirts." The conversation may further include a response to first message 310 (e.g., second message 320) from the first party that states "Great, can you send me $300 to my bank account? K Bank Account number 12929395." As can be seen, the conversation may be associated with a transaction for 3 white shirts.

Figure 4B:
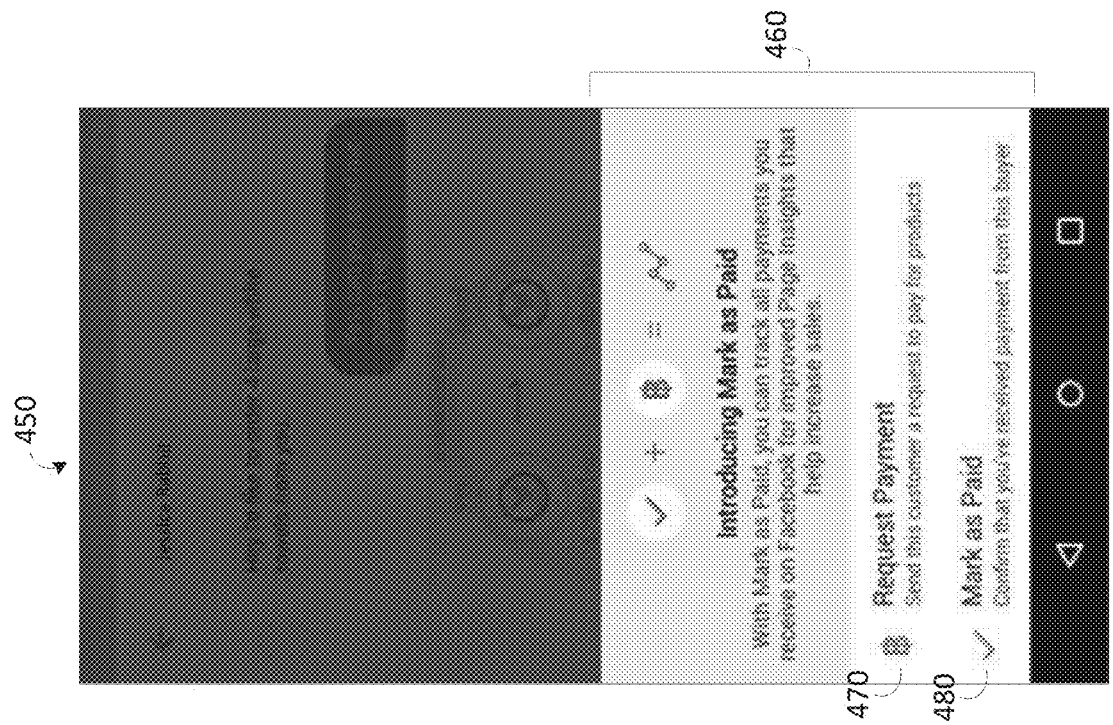
FIGS. 4A and 4B depict another example of a user interface for presenting a conversation via a messaging platform according to certain embodiments.
Figure 4A:
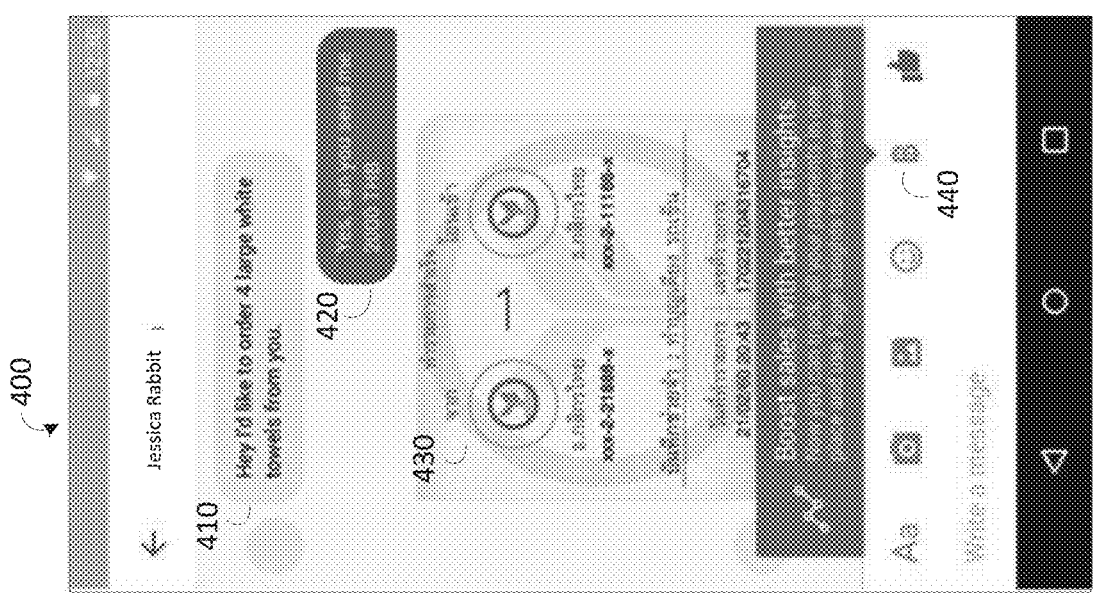

FIG. 4A depicts an example of graphical user interface (GUI) 400 that includes user-selectable option 440 for indicating an occurrence of an event outside of the messaging platform according to certain embodiments. Similar to GUI 300, GUI 400 may be associated with a conversation between a first party and a second party. The second party may be requesting to order a product or service (such as is included in first message 410). The first party may indicate acceptance of an offer made by the second party (such as is included in second message 420). The second party may then send a message that includes a confirmation of a transfer from the second party to the first party (e.g., as illustrated in third message 430). And similarly as described above for FIG. 3, GUI 400 may include user-selectable option 440. While user-selectable option 440 is different than user-selectable option 330, both may indicate the occurrence of the event (e.g., that a transaction has completed).

FIG. 4B depicts an example of GUI 450, which may result from selection of user selectable option 440 in FIG. 4A. GUI 450 may include portion 460, which is presented on top of at least a portion of GUI 400. Portion 460 may include multiple user-selectable options, each user-selectable option for indicating a different event. For example, first user-selectable option 470 may indicate that a first party wishes for a second party to send value to the first party. Second user-selectable option 480 may indicate that the first party has received the value sent by the second party (sometimes referred to as a conversion event).

Referring back to FIG. 2, at 220, the processing may further include receiving a signal indicating selection of the user-selectable option by a party (e.g., the first party or the second party). As described above, selection of the user-selectable option may indicate an occurrence of an event outside of the messaging platform.

At 230, a second GUI may be provided via the messaging platform. The second GUI may be for enabling the party to enter information related to the event. Examples of information that may be entered include a value associated with the event, a description of the event, or the like. Then, at 240, the information related to the event may be received via the second graphical user interface. For example, the party may cause the information related to the event to be sent to the messaging platform.

While the embodiments described in FIGS. 2, 3, 4A, and 4B present a user-selectable option at all times during a conversation, some embodiments described herein determine when to present the user-selectable option. For example, one or more messages may be analyzed to determine a likelihood that an event occurred outside of the messaging platform. If it is likely that the event occurred, the user-selectable option may be provided to one or more parties of the conversation.

FIG. 5 is a simplified flowchart depicting processing performed for determining an occurrence of an event based on a document in a message according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain embodiments, the steps may be performed in some different order or some steps may also be performed in parallel.

Figure 6B:
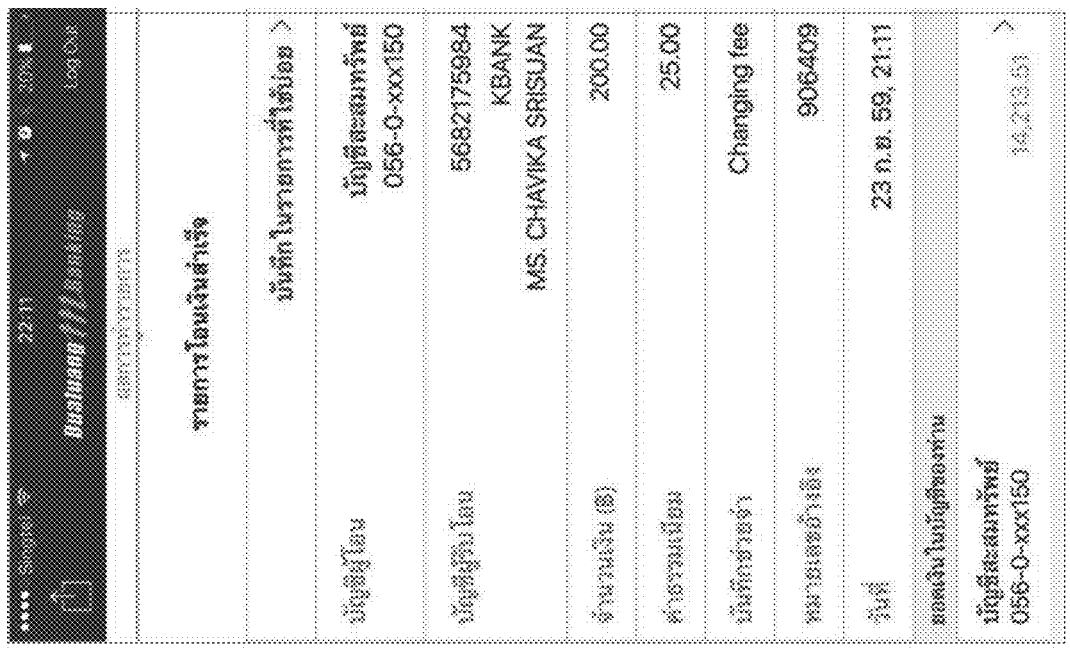
FIGS. 6A and 6B depict examples of a document indicating an occurrence of an event.
Figure 6A:
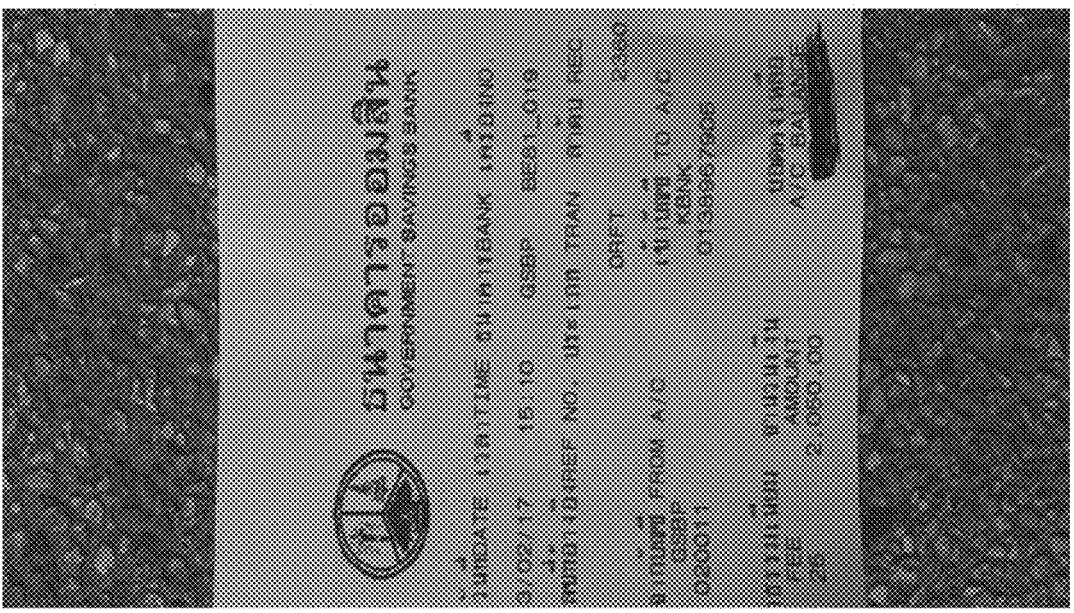

In the embodiment depicted in FIG. 5, the processing may be triggered at 510 when communication of a message with a document is detected in a conversation between a first party and a second party via a messaging platform. The document may be an image, a portable file document (PDF), a word document, a spreadsheet, a Power Point document, a text file, or the like. FIGS. 6A and 6B each depict an example of a document indicating an occurrence of an event. The document in FIG. 6A illustrates a photograph of a receipt for a transfer of value from a first bank to a second bank. The document in FIG. 6B illustrates a screenshot of a receipt for a transfer of value from a first bank to a second bank. While these figures depict possible documents, it should be recognized that other documents may indicate an occurrence of an event.

Referring back to FIG. 5, at 520, it may be determined that the message is indicative of an occurrence of an event outside the messaging platform. For example, the message and/or the document may be input to a machine learning model to determine whether the message is indicative of the occurrence of the event outside of the messaging platform. In such an example, an output of the machine learning model may be a classification of whether the event occurred outside of the messaging platform (e.g., that the document indicates an occurrence of the event). For example, metadata associated with the document, a document type, a document name, or the like may be used by the machine learning model to classify the document. For another example, multiple documents that are indicative of an occurrence of an event may be used as training data for a machine learning model such that the machine learning model may classify documents as indicative of an occurrence of an event. In such an example, multiple documents that are not indicative of an occurrence of an event may also be used as input (with labels indicating which documents are indicative and which documents are not indicative of an event) for training the machine learning model. By having documents with corresponding labels, the machine learning model may learn how to distinguish between documents that indicate an occurrence of an event and documents that do not indicate an occurrence of an event. In one illustrative example, the machine learning model may be used to recognize receipts. In some examples, instead of a machine learning model, a set of one or more criteria may be used to determine whether the message is indicative of the occurrence of the event outside the messaging platform. The one or more criteria may be similar to that which the machine learning model uses in its determination.

In some examples, rather than just using the message and/or the document, context around the message and/or the document may be used to determine whether an event occurred outside of the messaging platform. For example, messages sent prior to the message or after the message may be used to determine whether the event occurred outside of the messaging platform. Other information may also be used, such as information known by a social networking system regarding either the first party or the second party.

In response to determining that the message is indicative of the occurrence of the event, a user-selectable option (similar to the user-selectable option described in FIG. 3) may be presented in a graphical user interface. However, unlike in FIG. 3, this user-selectable option may only be visible after it has been determined that the message is indicative of the occurrence of the event.

Figure 7:
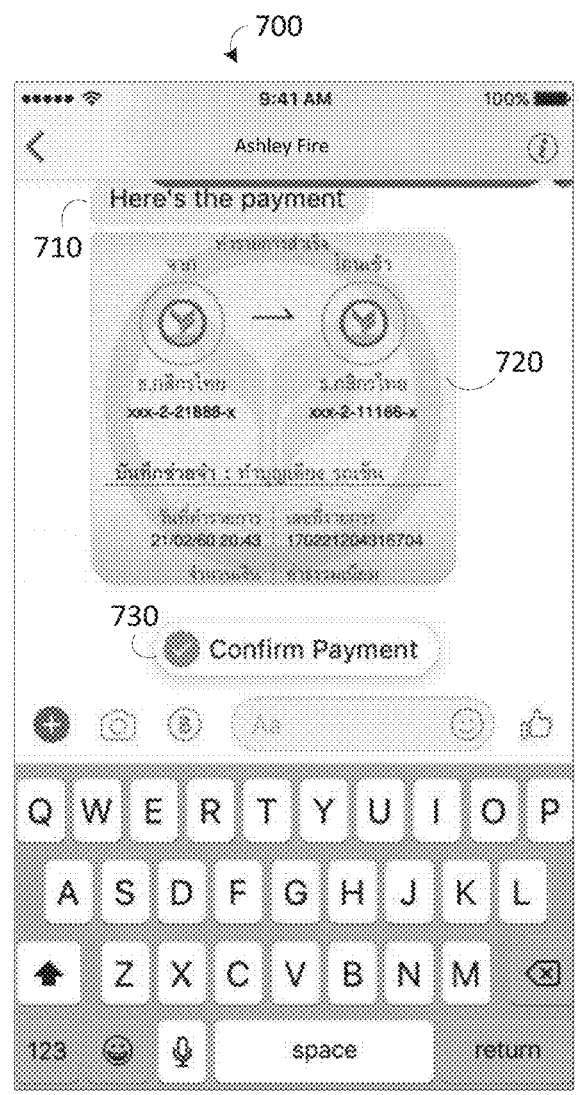
FIG. 7 depicts an example of a graphical user interface that includes a user-selectable option that is presented in response to determining an occurrence of an event outside of a messaging platform.

FIG. 7 depicts an example of graphical user interface 700 that includes user-selectable option 730 that is presented in response to determining an occurrence of an event outside of a messaging platform. Graphical user interface 700 may include a conversation between a first party and a second party that is provided be a messaging platform. The conversation may include first message 710, which states "Here's the payment." The conversation may further include second message 730, which includes a document (e.g., an image, a portable file document (PDF), a word document, a spreadsheet, a Power Point document, a text file, or the like).

Based on first message 710 and/or second message 730, it may be determined that an occurrence of an event occurred outside of the messaging platform. For example, first message 710 may indicate that a payment has been provided to a party. For another example, the document in second message 730 may be determined to be indicative of the occurrence of the event. In such an example, the document may be a receipt for the second party paying the first party $300 using a service outside of the messaging platform. For example, the second party may have used an application associated with their bank to send the $300 to the first party. User-selectable option 730 may be used to confirm that the event has occurred.

By selecting user-selectable option 730, a graphical user interface (as described below) may be presented to either enter information related to the event or present information extracted from the document.

Referring back to FIG. 5, at 530, a graphical user interface (GUI) may be provided via the messaging platform to enable a party to enter information related to the event. Examples of information related to the event include a value, a description, a name of one or more parties, a time stamp, a name of a bank, or the like. At 540, the information related to the event may be received via the GUI.

Figure 8:
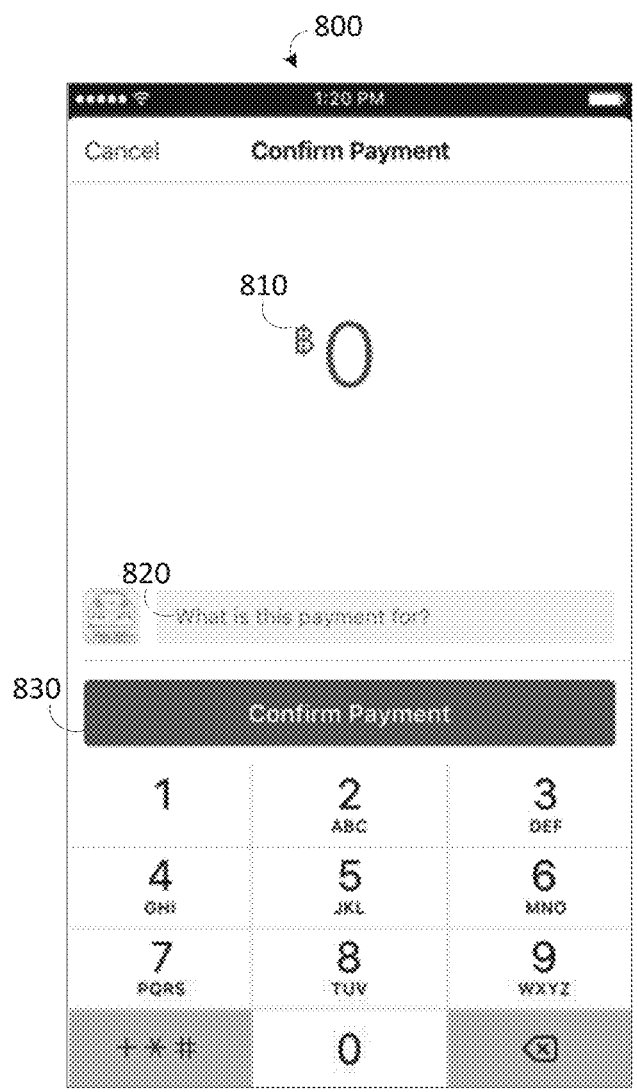
FIG. 8 depicts an example of a graphical user interface for entering information related to an event according to certain embodiments.

FIG. 8 depicts an example of graphical user interface (GUI) 800 for entering information related to an event according to certain embodiments. GUI 800 may be presented after it is determined that the event occurred (e.g., when user-selectable option 330 is selected, when it is determined that a message indicated an occurrence of the event, or the like). GUI 800 may allow a party to enter value 810 associated with the event. GUI 800 may also allow a party to enter description 820 for the event. After value 810 and/or description 820 is entered into GUI 800, confirmation user-selectable option 830 may be selected to cause value 810 and/or description 820 to be stored such that it is associated with a first party and/or a second party.

FIG. 9 is a simplified flowchart depicting processing performed for determining an occurrence of an event based on extracted information from a document in a message according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain embodiments, the steps may be performed in some different order or some steps may also be performed in parallel.

In the embodiment depicted in FIG. 9, the processing may be triggered at 910 when communication of a message between a first party and a second party is detected, the message including a document and communicated via a messaging platform. As described above, examples of the document may be depicted in FIGS. 7 and 8.

At 920, information is extracted from the document. The information may include pixel values, a title of the document, a value associated with an occurrence of an event outside of the messaging platform, a description of the event, a name of a bank, a time stamp, or any other information that may be extracted from the document. While it should be recognized that there are many ways to recognize information from a document, in one example an automatic content recognition technique may be used.

At 930, whether an event occurred may be determined based on the extracted information. For example, the extracted information and/or the document may be input to a machine learning model to determine whether an event occurred outside of the messaging platform. For example, multiple examples of extracted information that are indicative of an occurrence of an event may be used as training data for a machine learning model such that the machine learning model may determine whether an event occurred. In some examples, instead of a machine learning model, a set of one or more criteria may be used to determine whether an event occurred outside the messaging platform. The one or more criteria may be similar to that which the machine learning model uses in its determination.

At 940, it may be determined whether more information is needed regarding the event. For example, some information related to the event may be missing from the extracted information. If no more information is needed, a first user interface may be displayed at 950, the first user interface enabling a party to confirm the accuracy of the extracted information.

If it is determined that more information is needed, a second user interface may be displayed at 960, the second user interface enabling a party to enter additional information related to the event. The additional information may correspond to the information that is needed in addition to the extracted information.

At 970, the additional information related to the event may be received via the second user interface. Then, after the additional information is received, the first user interface may be displayed at 980, the first user interface enabling a party to confirm the accuracy of the extracted information and the additional information.

Figure 10:
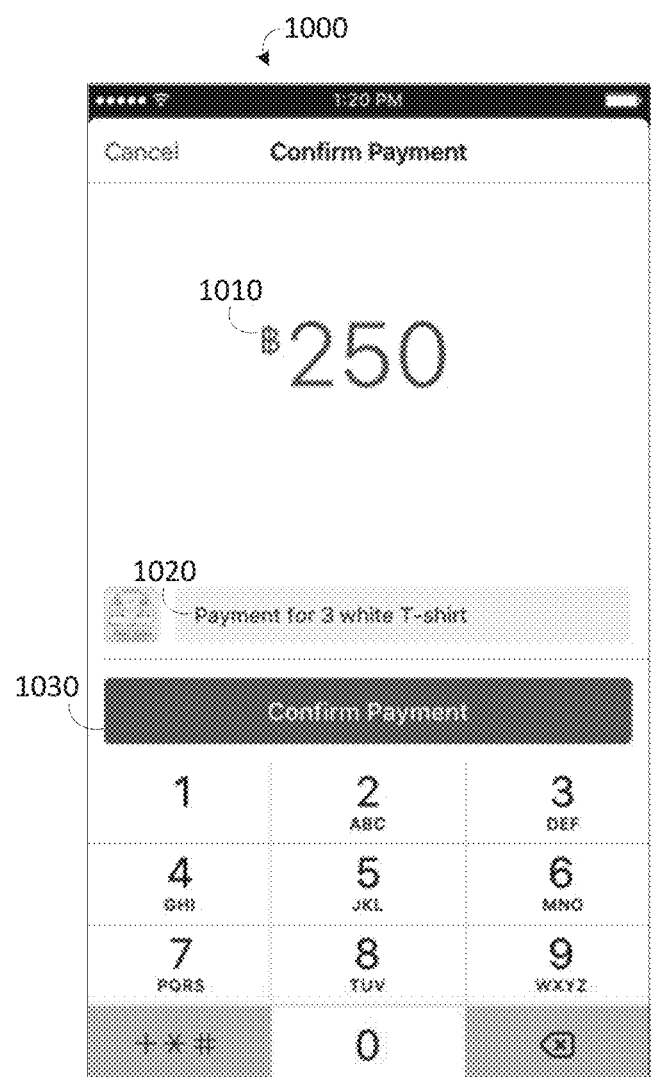
FIG. 10 depicts an example of a graphical user interface for confirming information related to an event according to certain embodiments.

FIG. 10 depicts an example of graphical user interface (GUI) 1000 for confirming information related to an event according to certain embodiments. GUI 1000 may be presented after information is extracted from a document in a message that is communicated between a first party and a second party via a messaging platform. In particular, information included in GUI 1000 may be identified from the extracted information. For example value 1010 may be extracted directly from the document, such that a user does not have to enter the amount in using GUI 1000. In addition, description 1020, which may describe what event occurred outside of the messaging platform, may be directly extracted from the document without a user having to enter a description. GUI 1000 may also be presented after information is entered by a party.

GUI 1000 may further include confirmation user-selectable option 1030. In response to selection of confirmation user-selectable option 1030, value 1010 and/or description 1020 (referred to as stored information) may be stored such that the stored information is associated with the first party and/or the second party. While GUI 1000 illustrates two types of information, it should be recognized that more or fewer types of information may be included in GUI 1000. For example, a name of banks, a time stamp, a name of a party involved, or other information related to an event may be included in GUI 1000. While FIG. 10 is described after FIG. 9, it should be recognized that the extracted information may be used for providing content to be displayed in GUI 1000 and not for identifying whether the document is indicative of an occurrence of an event. For example, the document may be determined to be indicative of an event based on information other than what is extracted from the document, such as described above in FIG. 5.

Figure 11B:
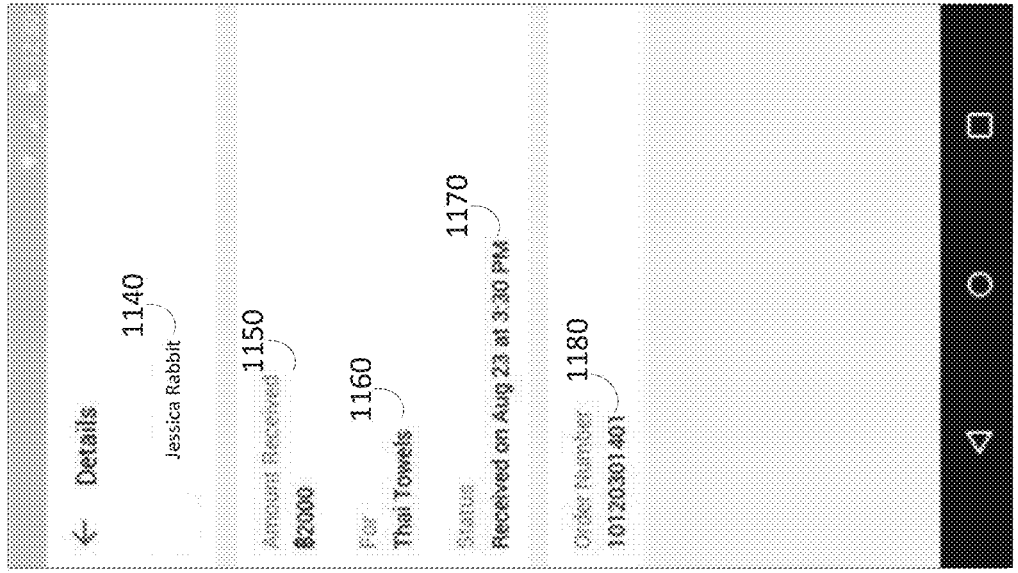
FIG. 11B depicts an example of a page for presenting details related to an event according to certain embodiments.
Figure 11A:
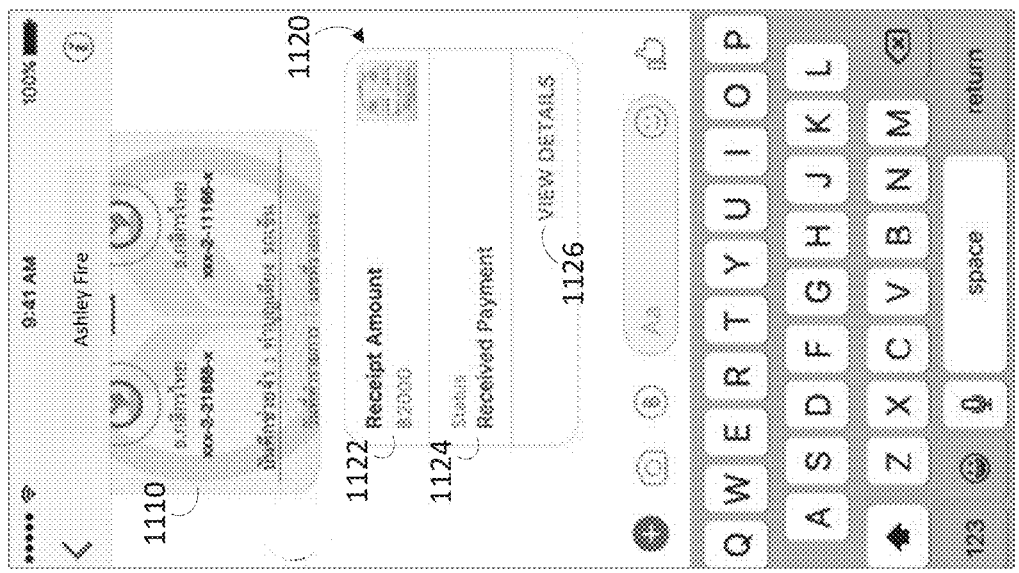
FIG. 11A depicts an example of a confirmation message that was sent to a party of a conversation via a messaging platform according to certain embodiments.

FIG. 11A depicts an example of confirmation message 1120 that was sent to a party of a conversation via a messaging platform according to certain embodiments. The conversation may be between a first party and a second party, where confirmation message 1120 was sent to the first party and/or the second party in response to the messaging platform (or a system associated with the messaging platform (e.g., a social networking system)) determining that an event occurred outside of the messaging platform.

In one illustrative example, the second party may have sent first message 1110, which included a document. In response to first message 1110, it may have been determined that an event occurred outside of the messaging platform. For example, a party of the conversation may have indicated using a user-selectable option that the event occurred. For another example, the messaging platform may have determined that the event occurred based on first message 1110.

Confirmation message 1120 may be sent to the party such that another party of the conversation might not see confirmation message 1120. For example, confirmation message 1120 may be visible to the first party but not the second party.

Confirmation message 1120 may include information related to the event. For example, confirmation message 1120 may include value 1122, status 1124, or the like. In such an example, status 1124 may indicate information regarding the event. Confirmation message 1120 may further include user-selectable option 1126 for viewing more details related to the event, as shown in FIG. 11B.

FIG. 11B depicts an example of page 1130 for presenting details related to an event according to certain embodiments. The details may have been extracted from a document included in a message in a conversation between a first party and a second party via a messaging platform. The details may have also been entered by a party of the conversation (e.g., the first party or the second party). The details may include a name of one or more of the parties (reference number 1140), a value 1150, a description 1160, a status 1170, order number 1180, or the like. However, it should be recognized that more or fewer details may be included in page 1130.

Referring back to FIG. 1, at 130, the processing may further include performing one or more actions based on information related to the event. For example, the information may be stored in a database, such that the information is associated with the first party or the second party. In another example, at least a portion of the information may be included in a message sent to the first party or the second party (as illustrated in FIG. 11A). In yet another example, the information may be aggregated, summarized, or otherwise collected with other information to be presented in the form of a report to the first party or the second party.

Figure 12:
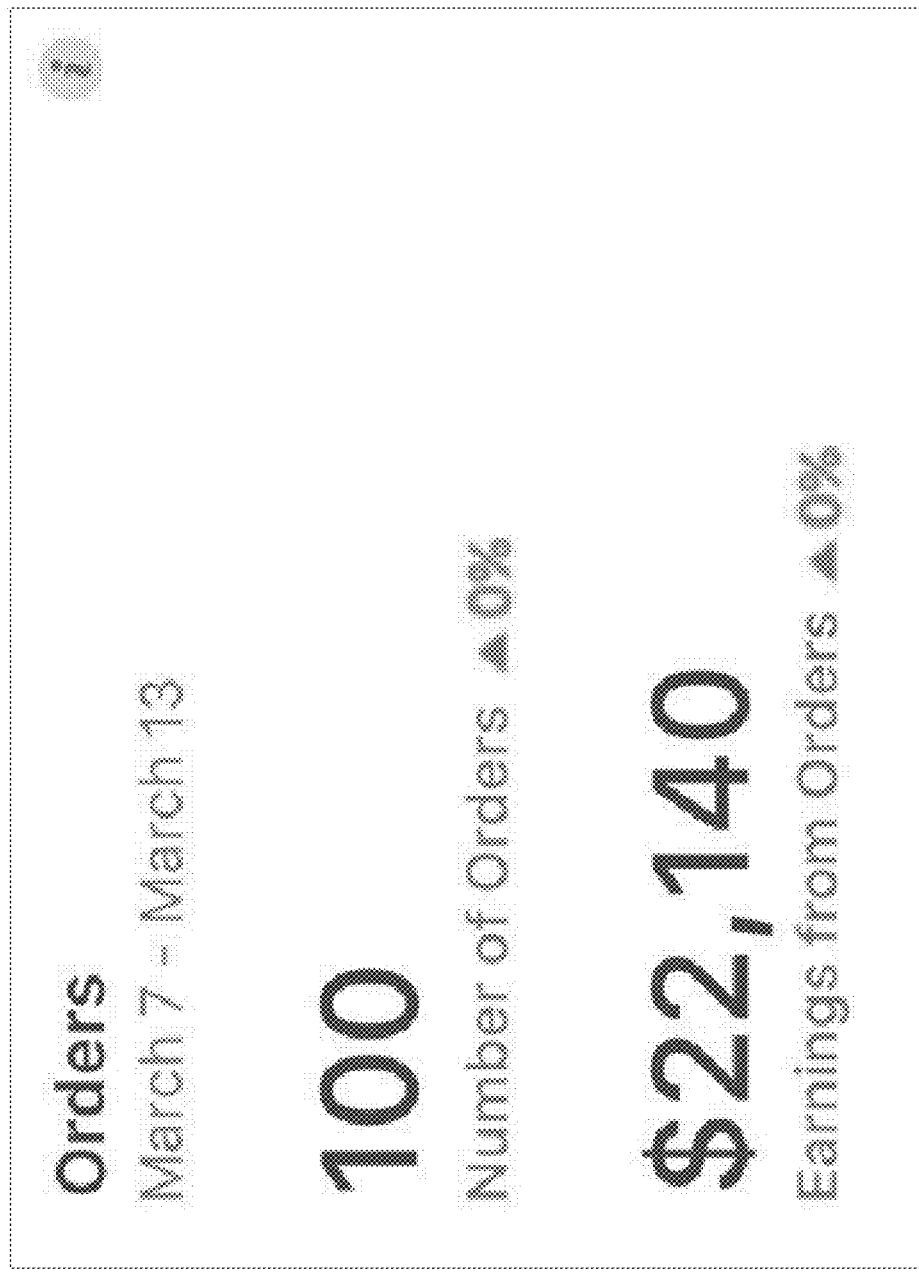
FIG. 12 depicts an example of a report for a party according to certain embodiments.

FIG. 12 depicts an example of a report for a party according to certain embodiments. The report includes information regarding orders that occurred between a timeframe of March 7th and March 13th. In one illustrative example, the report indicates that the party has completed 100 orders during the timeframe. The report may also indicate that the party has earned $22,140 from the 100 orders. Accordingly, the report has aggregated the earnings from each of the 100 orders to identify the amount earned from the 100 orders.

While the report illustrated in FIG. 12 indicates two types of metrics that may be identified from events, it should be recognized that there may be more or fewer metrics that may or may not include the two types of metrics described above. For example, a metric may include a number of parties that converse with a party, a number of parties that reach a conversion event with the party, information related to the conversion event, or the like. In one illustrative example, if the party is a seller of goods, a report generated for the first party may identify sales that occurred from conversations (e.g., sales pitches) made by the seller using the messaging platform. The report may also include information identifying a conversion rate for the seller, such as what percentage of the conversations that the seller was involved in using the messaging platform results in actual sales for the seller, where the sales occurred outside the messaging platform (or the social networking system providing the messaging platform).

Figure 13:
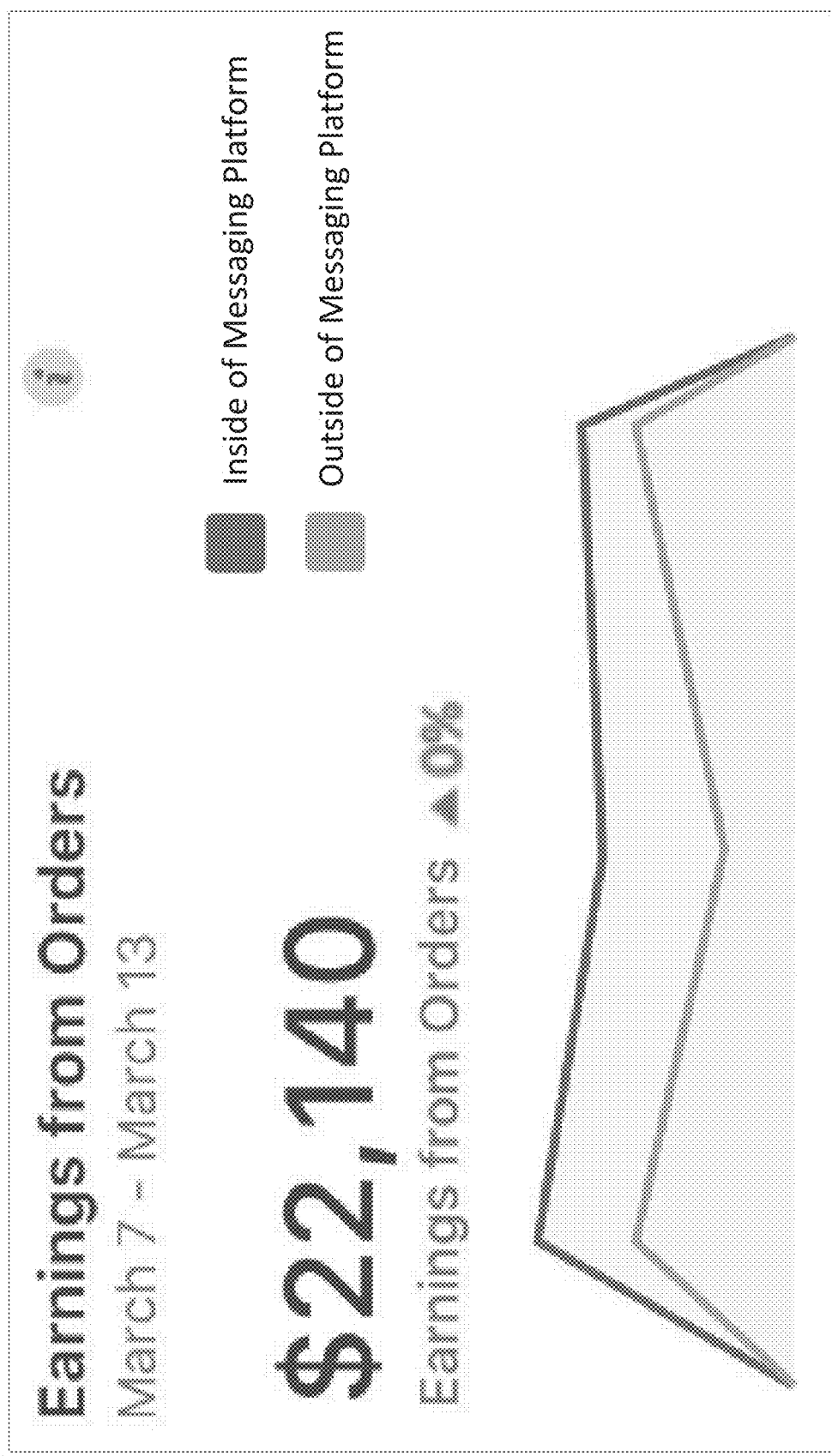
FIG. 13 depicts another example of a report for a party according to certain embodiments.

FIG. 13 depicts another example of a report for a party according to certain embodiments. The report depicted in FIG. 13 illustrates events that occurred inside of a messaging platform and events that occurred outside of the messaging platform. For example, the messaging platform (or a social networking system that provides the messaging platform) may include methods for performing events. As described above, it may be a more difficult to identify when an event occurred when the event did not occur on the messaging platform. Accordingly, techniques described herein provide techniques for identifying when an event has occurred outside of the messaging platform.

Figure 14:
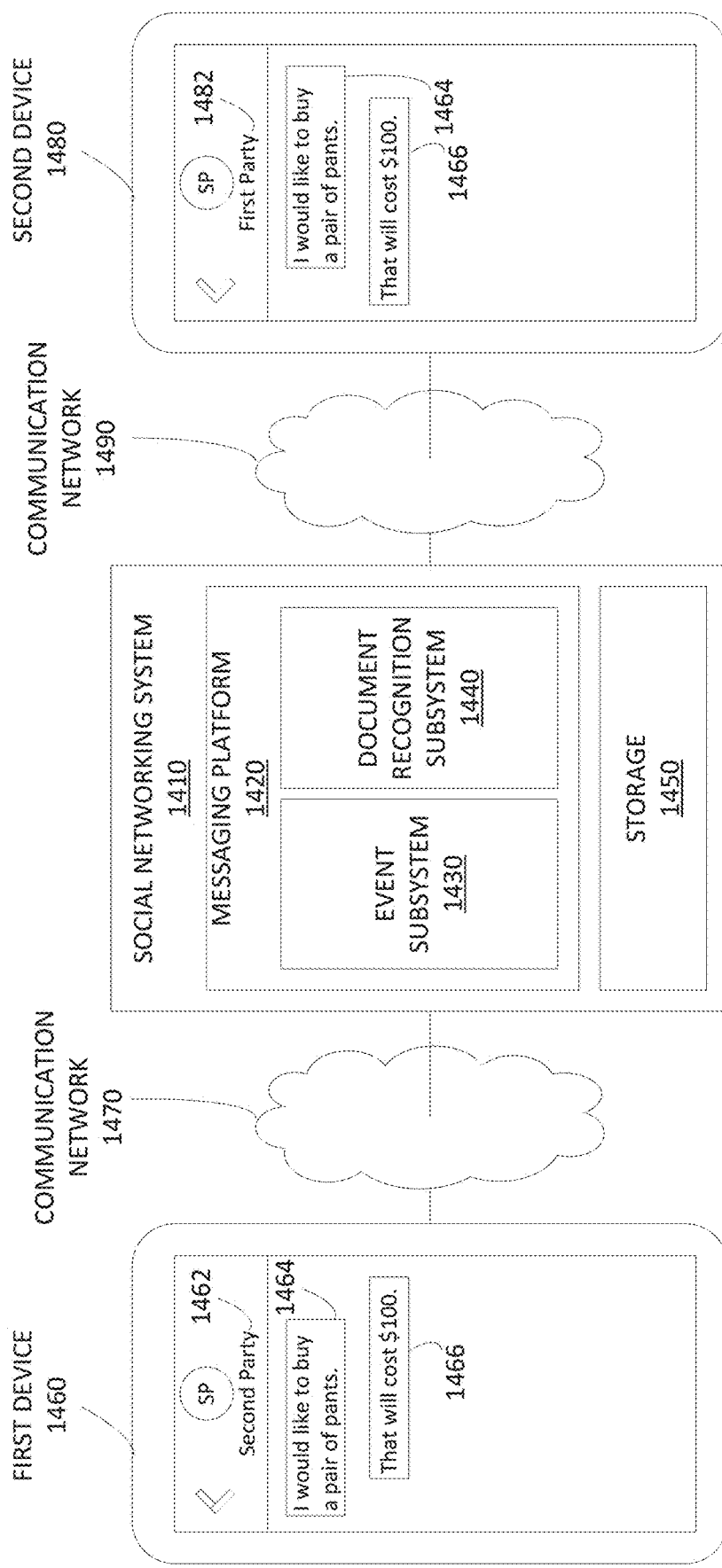
FIG. 14 is a simplified block diagram of a distributed system for tracking events according to certain embodiments.

FIG. 14 is a simplified block diagram of a distributed system for tracking events according to certain embodiments. The distributed system may include one or more systems, including social networking system (SNS) 1410, communicatively coupled with one or more user devices (e.g., first device 1460 and second device 1480). In certain embodiments, the one or more user devices may be communicatively coupled with SNS 1410 via one or more communication networks (e.g., communication network 1470 and communication network 1490). While communication network 1470 and communication network 1490 are illustrated as separate networks in FIG. 14, it should be recognized that they may be the same network. Examples of communication networks include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate communications including both wired and wireless protocols such as IEEE 802.XX suite of protocols, TCP/IP, IPX, SAN, AppleTalk®, Bluetooth®, InfiniBand, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

The distributed system depicted in FIG. 14 is merely an example and is not intended to unduly limit the scope of inventive embodiments recited in the claims. One of ordinary skill in the art would recognize many possible variations, alternatives, and modifications. For example, in some implementations, the distributed system may have more or fewer systems than those shown in FIG. 14, may combine two or more systems, or may have a different configuration or arrangement of systems.

The user devices depicted in FIG. 14 may sometimes be referred to as a client device, or simply a client. A user device (e.g., first device 1460 or second device 1480) may be a computing device, such as, for example, a mobile phone, a smart phone, a personal digital assistant (PDA), a tablet computer, an electronic book (e-book) reader, a gaming console, a laptop computer, a netbook computer, a desktop computer, a thin-client device, a workstation, etc.

One or more applications ("apps") may be hosted and executed by first device 1460 or second device 1480. The apps may be web browser-based applications or other types of applications. In the example embodiment depicted in FIG. 14, first device 1460 and second device 1480 each host and execute a messaging application, which enables a user to communicate with other users via messaging platform 1420 of SNS 1410.

As illustrated in FIG. 14, messaging platform 1420 may cause user interfaces to be presented by each of first device 1460 and second device 1480. For example, a first interface presented by first device 1460 may indicate that a conversation is with second party 1462. The first interface may also include first message 1464 and second message 1466. Similarly, a second interface presented by second device 1480 may indicate that a conversation is with first party 1482. The second interface may also include first message 1464 and second message 1466, which correspond to the messages presented in the first interface.

In the embodiment depicted in FIG. 14, SNS 1410 includes messaging platform 1420 for enabling a conversation between a first party (associated with first device 1460) and a second party (associated with second device 1480). The conversation may include one or more messages exchanged between the first party and the second party via messaging platform 1420. For example, second device 1480 may have sent first message 1464 to the first party. First device 1460 may receive first message 1464 through at least communication network 1470. First message 1464 may include a request to buy a pair of pants. The first party, using first device 1460, may send a response to first message 1464 (i.e., second message 1466). The response may indicate a price for the pair of pants. Second device 1480 may receive second message 1466 through at least communication network 1490.

Messaging platform 1420 may further include event system 1430 for determining and handling an occurrence of an event inside and/or outside of messaging platform 1420. While the occurrence of the event may be determined in many ways, examples for this process include presenting a user-selectable option to a party for indicating that the event occurred, using a set of one or more criteria or machine learning model for determining (based on one or more messages exchanged between the first party and the second party) whether the event occurred, or extracting information from a document included in a message that indicates that the event occurred.

In embodiments where information is extracted from a document, messaging platform 1420 may further include document recognition subsystem 1440. Document recognition subsystem 1440 may take as input a document included in a message. Based on the document, document recognition subsystem 1440 may identify whether an event has occurred outside of messaging platform 1420. While document recognition subsystem 1440 may utilize content of the document, it should also be recognized that metadata of the document may be used in addition to or instead of the content.

After an event is determined, information related to the event may be stored in storage 1450 such that the information is associated with the first party and/or the second party. While FIG. 14 illustrates storage 1450 included in SNS 1410, it should be recognized that storage 1450 may be remote from SNS 1410.

Figure 15:
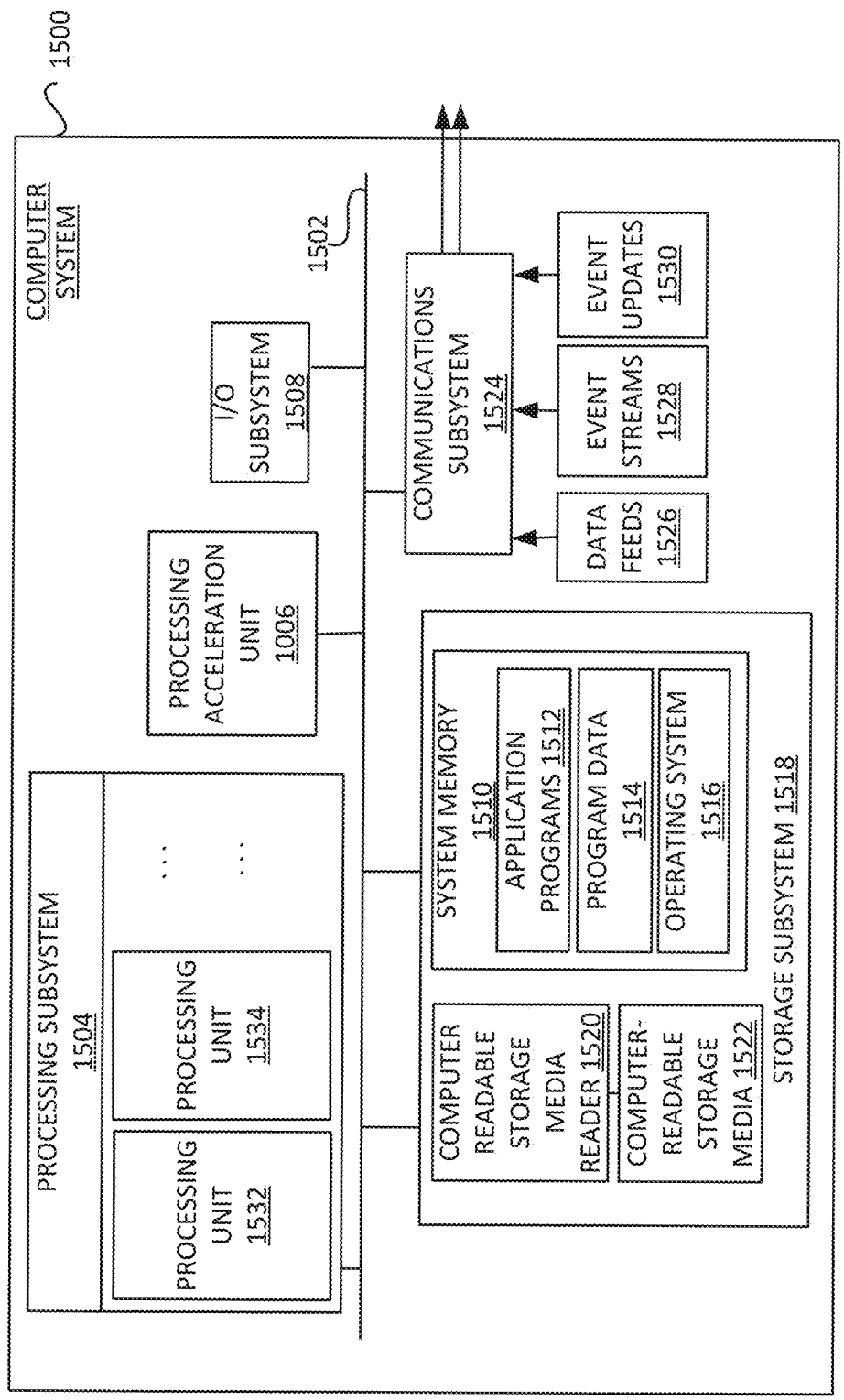
FIG. 15 illustrates an example of a computer system that may be used to implement certain embodiments described herein.

FIG. 15 illustrates an example of computer system 1500, which may be used to implement certain embodiments described herein. For example, in some embodiments, computer system 1500 may be used to implement any of the systems, servers, devices, or the like described above. As shown in FIG. 15, computer system 1500 includes various subsystems including processing subsystem 1504 that communicates with a number of other subsystems via bus subsystem 1502. These other subsystems may include processing acceleration unit 1506, I/O subsystem 1508, storage subsystem 1518, and communications subsystem 1524. Storage subsystem 1518 may include non-transitory computer-readable storage media including storage media 1522 and system memory 1510.

Bus subsystem 1502 provides a mechanism for letting the various components and subsystems of computer system 1500 communicate with each other as intended. Although bus subsystem 1502 is shown schematically as a single bus, alternative embodiments of bus subsystem 1502 may utilize multiple buses. Bus subsystem 1502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1504 controls the operation of computer system 1500 and may comprise one or more processors, application specific integrated circuits (ASICs), or field programmable gate arrays (FPGAs). The processors may include single core and/or multicore processors. The processing resources of computer system 1500 may be organized into one or more processing units 1532, 1534, etc. A processing unit may include one or more processors, one or more cores from the same or different processors, a combination of cores and processors, or other combinations of cores and processors. In some embodiments, processing subsystem 1504 may include one or more special purpose co-processors such as graphics processors, digital signal processors (DSPs), or the like. In some embodiments, some or all of the processing units of processing subsystem 1504 may be implemented using customized circuits, such as application specific integrated circuits (ASICs), or field programmable gate arrays (FPGAs).

In some embodiments, the processing units in processing subsystem 1504 may execute instructions stored in system memory 1510 or on computer readable storage media 1522. In various embodiments, the processing units may execute a variety of programs or code instructions and may maintain multiple concurrently executing programs or processes. At any given time, some or all of the program code to be executed may be resident in system memory 1510 and/or on computer-readable storage media 1522 including potentially on one or more storage devices. Through suitable programming, processing subsystem 1504 may provide various functionalities described above. In instances where computer system 1500 is executing one or more virtual machines, one or more processing units may be allocated to each virtual machine.

In certain embodiments, processing acceleration unit 1506 may optionally be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term input device is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1500 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information and data that is used by computer system 1500. Storage subsystem 1518 provides a tangible non-transitory computer-readable storage medium for storing the basic programming and data constructs that provide the functionality of some embodiments. Storage subsystem 1518 may store software (e.g., programs, code modules, instructions) that when executed by processing subsystem 1504 provides the functionality described above. The software may be executed by one or more processing units of processing subsystem 1504. Storage subsystem 1518 may also provide a repository for storing data used in accordance with the teachings of this disclosure.

Storage subsystem 1518 may include one or more non-transitory memory devices, including volatile and non-volatile memory devices. As shown in FIG. 15, storage subsystem 1518 includes system memory 1510 and computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM), dynamic random access memory (DRAM), and the like.

By way of example, and not limitation, as depicted in FIG. 15, system memory 1510 may load application programs 1512 that are being executed, which may include various applications such as Web browsers, mid-tier applications, relational database management systems (RDBMS), etc., program data 1514, and operating system 1516.

Computer-readable storage media 1522 may store programming and data constructs that provide the functionality of some embodiments. Computer-readable media 1522 may provide storage of computer-readable instructions, data structures, program modules, and other data for computer system 1500. Software (programs, code modules, instructions) that, when executed by processing subsystem 1504 provides the functionality described above, may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1518 may also include computer-readable storage media reader 1520 that may further be connected to computer-readable storage media 1522. Reader 1520 may receive and be configured to read data from a memory device such as a disk, a flash drive, etc.

In certain embodiments, computer system 1500 may support virtualization technologies, including but not limited to virtualization of processing and memory resources. For example, computer system 1500 may provide support for executing one or more virtual machines. In certain embodiments, computer system 1500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1500. Accordingly, multiple operating systems may potentially be run concurrently by computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices. For example, when computer system 1500 is used to implement social networking system 1410 depicted in FIG. 14, communication subsystem 1524 may be used to communicate with first device 1460 or second device 1480.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1524 may provide wired network connectivity (e.g., Ethernet) in addition to or instead of a wireless interface.

Communication subsystem 1524 may receive and transmit data in various forms. For example, in some embodiments, in addition to other forms, communications subsystem 1524 may receive input communications in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as web feeds and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1524 may also be configured to communicate data from computer system 1500 to other computer systems or networks. The data may be communicated in various different forms such as structured and/or unstructured data feeds 1526, event streams 1528, event updates 1530, and the like to one or more databases that may be in communication with one or more streaming data source computers coupled to computer system 1500.

Computer system 1500 may be one of various types, including a handheld portable device, a wearable device, a personal computer, a workstation, a mainframe, a kiosk, a server rack, or any other data processing system. Due to the ever-changing nature of computers and networks, the description of computer system 1500 depicted in FIG. 15 is intended only as a specific example. Many other configurations having more or fewer components than the system depicted in FIG. 15 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A non-transitory computer-readable storage medium storing a plurality of instructions executable by one or more processors, wherein the plurality of instructions, when executed by the one or more processors, cause the one or more processors to perform processing comprising:
   enabling a conversation between a first user and a second user via a messaging platform, wherein the conversation includes one or more messages exchanged between the first user and the second user via the messaging platform;
   determining, by the messaging platform, an occurrence of an event between the first user and the second user, the event occurring outside the messaging platform and resulting from the conversation, wherein the event is a transaction, and wherein the occurrence of the event is determined based on a first message of the one or more messages;
   detecting communication of the first message, the first message including a document;
   extracting information from the document, wherein determining the occurrence of the event comprises determining the occurrence of the event based on the extracted information;
   obtaining, by the messaging platform, information about the event, wherein the information about the event is obtained as part of determining the occurrence of the event or in response to the determining of the occurrence of the event;
   storing the information about the event such that the information is associated with the first user; and
   generating a report for the first user using the information about the event.

2. The non-transitory computer-readable storage medium of claim 1, wherein the information extracted from the document includes a first portion of the information about the event, and wherein the processing further comprises:
   providing, via the messaging platform, a graphical user interface for the first user or the second user to enter a second portion of the information about the event that could not be extracted from the document.

3. The non-transitory computer-readable storage medium of claim 1, wherein the information extracted from the document includes at least some of the information about the event, and wherein the processing further comprises:
   after extracting the information from the document, causing a user interface provided by the messaging platform to be presented to the first user or the second user, wherein the user interface is a graphical user interface through which the first user or the second user confirms that the at least some of the information about the event is correct, and wherein the storing of the information about the event is conditioned upon receiving a confirmation from the first user or the second user via the user interface.

4. The non-transitory computer-readable storage medium of claim 1, wherein the processing further comprises:
   determining, using a machine learning model, that the document is indicative of the occurrence of the event.

5. The non-transitory computer-readable storage medium of claim 1, wherein the processing further comprises:
   determining that the document meets one or more criteria regarding a document type of the document, a name of the document, a content of the document, or metadata of the document, wherein the determining of the occurrence of the event is based on the determining that the document meets the one or more criteria.

6. The non-transitory computer-readable storage medium of claim 1, wherein the processing further comprises:
   causing a user interface provided by the messaging platform to be presented to the first user or the second user in response to determining the occurrence of the event, wherein the user interface is a graphical user interface through which the first user or the second user supplies at least some of the information about the event.

7. The non-transitory computer-readable storage medium of claim 6, wherein the information supplied through the user interface is a value associated with the transaction.

8. The non-transitory computer-readable storage medium of claim 1, wherein the processing further comprises:
   determining, by the messaging platform, an occurrence of a second event between the first user and a third user, the second event occurring outside the messaging platform and resulting from a second conversation not involving the second user, wherein the second event is a second transaction, and wherein the occurrence of the second event is determined based on a second message from the second conversation;
   obtaining, by the messaging platform, information about the second event, wherein the information about the second event is obtained as part of determining the occurrence of the second event or in response to the determining of the occurrence of the second event; and
   storing the information about the second event in association with the first user,
   wherein the report is generated using the information about the second event.

9. The non-transitory computer-readable storage medium of claim 8, wherein the report generated for the first user comprises a metric indicating how many conversations involving the first user resulted in transactions outside of the messaging platform.

10. The non-transitory computer-readable storage medium of claim 1, wherein the processing further comprises:
    generating a report for the second user, the report for the second user comprising information about the transaction and different from information contained in the report for the first user.

11. A method comprising:
    enabling a conversation between a first user and a second user via a messaging platform, wherein the conversation includes one or more messages exchanged between the first user and the second user via the messaging platform;
    determining, by the messaging platform, an occurrence of an event between the first user and the second user, the event occurring outside the messaging platform and resulting from the conversation, wherein the event is a transaction, and wherein the occurrence of the event is determined based on a first message of the one or more messages;
    detecting communication of the first message, the first message including a document;
    extracting information from the document, wherein determining the occurrence of the event comprises determining the occurrence of the event based on the extracted information;
    obtaining, by the messaging platform, information about the event, wherein the information about the event is obtained as part of determining the occurrence of the event or in response to the determining of the occurrence of the event;

storing the information about the event such that the information is associated with the first user; and
generating a report for the first user using the information about the event.

12. The method of claim 11, further comprising:
determining, using a machine learning model, that the document is indicative of the occurrence of the event.

13. The method of claim 11, further comprising:
causing a user interface provided by the messaging platform to be presented to the first user or the second user in response to determining the occurrence of the event, wherein the user interface is a graphical user interface through which the first user or the second user supplies at least some of the information about the event.

14. The method of claim 13, wherein the information supplied through the user interface is a value associated with the transaction.

15. The method of claim 11, further comprising: providing, via the messaging platform, a graphical user interface for the first user or the second user to enter a second portion of the information about the event that could not be extracted from the document, wherein the information extracted from the document includes a first portion of the information about the event.

16. The method of claim 11, further comprising: determining that the document meets one or more criteria regarding a document type of the document, a name of the document, a content of the document, or metadata of the document, wherein the determining of the occurrence of the event is based on the determining that the document meets the one or more criteria.

17. The method of claim 11, further comprising:
determining, by the messaging platform, an occurrence of a second event between the first user and a third user, the second event occurring outside the messaging platform and resulting from a second conversation not involving the second user, wherein the second event is a second transaction, and wherein the occurrence of the second event is determined based on a second message from the second conversation;
obtaining, by the messaging platform, information about the second event, wherein the information about the second event is obtained as part of determining the occurrence of the second event or in response to the determining of the occurrence of the second event; and
storing the information about the second event in association with the first user,
wherein the report is generated using the information about the second event.

18. The method of claim 17, wherein the report generated for the first user comprises a metric indicating how many conversations involving the first user resulted in transactions outside of the messaging platform.

19. The method of claim 11, further comprising:
generating a report for the second user, the report for the second user comprising information about the transaction and different from information contained in the report for the first user.

20. The method of claim 11, wherein the information extracted from the document includes at least some of the information about the event, the method further comprising:
after extracting the information from the document, causing a user interface provided by the messaging platform to be presented to the first user or the second user, wherein the user interface is a graphical user interface through which the first user or the second user confirms that the at least some of the information about the event is correct, and wherein the storing of the information about the event is conditioned upon receiving a confirmation from the first user or the second user via the user interface.

21. A system comprising:
one or more processors; and
a non-transitory computer-readable medium including instructions that, when executed by the one or more processors, cause the one or more processors to:
enable a conversation between a first user and a second user via a messaging platform, wherein the conversation includes one or more messages exchanged between the first user and the second user via the messaging platform;
determine an occurrence of an event between the first user and the second user, the event occurring outside the messaging platform and resulting from the conversation, wherein the event is a transaction, and wherein the occurrence of the event is determined based on a first message of the one or more messages;
detect communication of the first message, the first message including a document;
extract information from the document, wherein the one or more processors determine the occurrence of the event based on the extracted information;
obtain information about the event, wherein the information about the event is obtained as part of determining the occurrence of the event or in response to the determining of the occurrence of the event;
store the information about the event such that the information is associated with the first user; and
generate a report for the first user using the information about the event.

22. The system of claim 21, wherein the instructions, when executed by the one or more processors, further cause the one or more processors to:
provide a graphical user interface for the first user or the second user to enter a second portion of the information about the event that could not be extracted from the document, wherein the information extracted from the document includes a first portion of the information about the event.

23. The system of claim 21, wherein the instructions, when executed by the one or more processors, further cause the one or more processors to:
determine, using a machine learning model, that the document is indicative of the occurrence of the event.

24. The system of claim 21, wherein the instructions, when executed by the one or more processors, further cause the one or more processors to:
determine that the document meets one or more criteria regarding a document type of the document, a name of the document, a content of the document, or metadata of the document, wherein the one or more processors determine the occurrence of the event based on determining that the document meets the one or more criteria.

25. The system of claim 21, wherein the instructions, when executed by the one or more processors, further cause the one or more processors to:
cause a user interface to be presented to the first user or the second user in response to determining the occurrence of the event, wherein the user interface is a graphical user interface through which the first user or the second user supplies at least some of the information about the event.

26. The system of claim 25, wherein the information supplied through the user interface is a value associated with the transaction.

27. The system of claim 21, wherein the instructions, when executed by the one or more processors, further cause the one or more processors to:
- determine an occurrence of a second event between the first user and a third user, the second event occurring outside the messaging platform and resulting from a second conversation not involving the second user, wherein the second event is a second transaction, and wherein the occurrence of the second event is determined based on a second message from the second conversation;
- obtain information about the second event, wherein the information about the second event is obtained as part of determining the occurrence of the second event or in response to the determining of the occurrence of the second event; and
- store the information about the second event in association with the first user,
- wherein the report is generated using the information about the second event.

28. The system of claim 27, wherein the report generated for the first user comprises a metric indicating how many conversations involving the first user resulted in transactions outside of the messaging platform.

29. The system of claim 21, wherein the instructions, when executed by the one or more processors, further cause the one or more processors to:
- generate a report for the second user, the report for the second user comprising information about the transaction and different from information contained in the report for the first user.

30. The system of claim 21, wherein the information extracted from the document includes at least some of the information about the event, and wherein the instructions, when executed by the one or more processors, further cause the one or more processors to:
- after extracting the information from the document, cause a user interface provided by the messaging platform to be presented to the first user or the second user, wherein the user interface is a graphical user interface through which the first user or the second user confirms that the at least some of the information about the event is correct, and wherein the storing of the information about the event is conditioned upon receiving a confirmation from the first user or the second user via the user interface.

* * * * *